United States Patent [19]
Pinkowski et al.

[11] 3,773,562
[45] Nov. 20, 1973

[54] ALKALINE PRIMARY BATTERY CELLS

[75] Inventors: Alexander Pinkowski; Hans-Werner Uhlig, both of Berlin, Germany

[73] Assignee: Kombinat VEB Galvanische Elemente, Zwickau, Germany

[22] Filed: Dec. 13, 1971

[21] Appl. No.: 207,023

[52] U.S. Cl. .............................................. 136/107
[51] Int. Cl. ........................................ H01m 21/00
[58] Field of Search ................ 136/107, 102, 133, 136/125, 134–135, 166, 175, 14, 169

[56] References Cited
UNITED STATES PATENTS

| | | | |
|---|---|---|---|
| 2,480,839 | 9/1949 | Daniel | 136/107 |
| 2,678,343 | 5/1954 | Daniel | 136/136 |
| 3,501,351 | 3/1970 | Karobath | 136/133 |
| 2,922,832 | 1/1960 | Gottschall et al. | 136/133 |
| 2,993,947 | 7/1961 | Leger | 136/107 |
| 3,219,487 | 11/1965 | Krouse et al. | 136/107 |
| 2,572,017 | 10/1951 | Ellis | 136/107 |
| 2,710,307 | 6/1955 | Szundy | 136/106 |
| 3,427,203 | 2/1969 | Fletcher | 136/120 |
| 3,607,429 | 9/1971 | Kocherginsky | 136/107 |

*Primary Examiner*—Anthony Skapars
*Attorney*—Tab T. Thein

[57] ABSTRACT

Alkaline primary battery cells, comprising conventional cylindrical manganese-dioxide and powdery zinc electrodes with a separator therebetween, including a non-metallic, plastic beaker for lodging the electrodes, and at least one electrical contact in a terminal portion of the beaker, provided in a hermetically sealed manner, the contact being associated with one of the electrodes. The plastic beaker is preferably from a material permeable to hydrogen. The electrical contact is either molded into the beaker or the latter is made, at least in part, from an electrically conductive material, such as a plastic having metal powder or graphite therein. The contact is linked to the appropriate electrode by a metallic conductor which may be a wire or a sleeve, the latter with smooth or perforated walls.

10 Claims, 5 Drawing Figures

Patented Nov. 20, 1973 3,773,562

INVENTORS
ALEXANDER PINKOWSKI
HANS-WERNER UHLIG
BY
AGENT

ALKALINE PRIMARY BATTERY CELLS

The invention relates to alkaline primary battery cells having a cylindrical manganese-dioxide electrode and a powdered zinc electrode, with a non-metallic, plastic beaker and preferably a metallic conductor for linking at least one of the electrical contacts to the respective electrode.

Alkaline manganese-dioxide — zinc battery cells are known in which a manganite electrode is in the form of a hollow cylinder or cup, pressed into a metal beaker which acts as the outer electrode. The soluble electrode from pressed or pasty zinc powder forms the inner electrode. Furthermore, alkaline manganite — zinc cells became known in which the zinc electrodes are outside, within metal beakers or cups, while the cylinder-shaped manganite electrodes are inside. The cells are positively closed by means of plastic seals. The closures also serve as valves for the hydrogen produced during discharge and storage of the cells as a result of zinc corrosion.

Additionally to the inner metal cups alkaline primary cells often contain outer metal covers to protect against the possible spilling of the electrolyte. The known alkaline manganite — zinc cells are relatively expensive as compared to so-called Leclanche cells because of the inner metal cups, the outer covers or envelopes, and the usually rather complicated seals or packings. Despite their considerably higher energy densities the alkaline cells could not displace or supplant so far the Leclanche cells.

Furthermore, metal cups used as contacts for the negative or positive electrodes prevent the hydrogen to be diffused off which forms as a result of zinc corrosion. There is an overpressure within the cells which requires the use of valves and excludes complete sealing of the cells.

It is one of the major objects of the invention to provide alkaline manganese-dioxide — zinc battery cells which have the known high energy density, are leakproof to the electrolyte, and can be manufactured at low cost.

Other objects relate to eliminating drawbacks of hitherto known structures, and to provide easy-to-manufacture, relatively inexpensive, reliable and small-size alkaline batteries of the kind described.

According to one of the important features of the invention, the major object has been solved in that a cylindrical manganite electrode as well as a zinc-powder electrode are disposed in a plastic beaker or cup which has a bottom contact for the necessary electrical connection. The plastic cup is hermetically closed in a positive manner by means of a plastic closure which includes the second contact.

It has been found that current can be derived from the zinc electrode in a satisfactory manner by the bottom contact alone, owing to high electron conductivity, so that a metal cup can be dispensed with.

It has also been found that the arrangement of the electrochemically effective portion of the alkaline manganite — zinc battery cells when lodged in a plastic beaker allows continuous diffusion of the hydrogen, resulting from the unavoidable corrosion, over the entire envelope surface, as a result of its excellent hydrogen permeability when a suitable plastic material is being selected. This avoids the formation of a substantial overpressure within the cells so that no valves are required.

The solution according to the invention allows the cells to be formed in an entirely leakproof manner, by known processes, by providing a positive connection between the cup and the closure. This can be done for example by welding on a plastic cover. The current derivation contacts can be provided in an entirely leakproof, known manner such as by inserting recessed metal plates or members into the plastic, e.g., by molding.

Tight contacting is furthermore possible in that the bottom of the plastic cup can be made of an electrically conductive plastic which is welded on, and in that the cover is made of a similar conductive plastic.

Alkaline manganese-dioxide — zinc battery cells which contain an inner cylindrical manganite electrode are usually provided with conductors constituted by carbon pins or rods, as customary in Leclanche cells, but according to the invention current is conducted preferably by a metallic conductor, for example by a wire or a metal tube since there is no corrosion of the metal in the alkaline medium. The use of carbon rods would be disadvantageous in alkaline manganite cells having electrodes which are compressed to a higher density than those of Leclanche cells in view of the relatively low stability of these rods.

Metallic conductors are also more advantageous cost-wise. When using a wire conductor there is more room left for the manganese-dioxide electrode. This allows the capacity of the battery cells to be increased.

According to further important features of the invention, at least one electrical contact is provided in a terminal portion of the plastic beaker (top and/or bottom), in a hermetically sealed manner, in electrical contact with one of the electrodes.

For connecting the contact to the electrode, the invention provides a metallic conductor which may be a wire, a tube or sleeve, and the latter may be solid or perforated, as will be explained in detail.

While the electrical contact may be molded into the bottom or top of the beaker, it could also be constituted by an electrically conductive plastic portion of the beaker, e.g., made from a graphite-containing plastic, welded or otherwise secured to the rest of the beaker.

The beaker is preferably made from a plastic which is permeable to hydrogen. A sealing compound may optionally be applied inside the beaker.

Other objects and many of the attendant advantages of the invention will be readily appreciated as the same becomes better understood by reference to the following detailed description, when considered with the accompanying drawings, wherein FIG. 1 is a vertical or longitudinal section through one of the preferred embodiments of the inventive alkaline primary battery cells;

Figure 4:
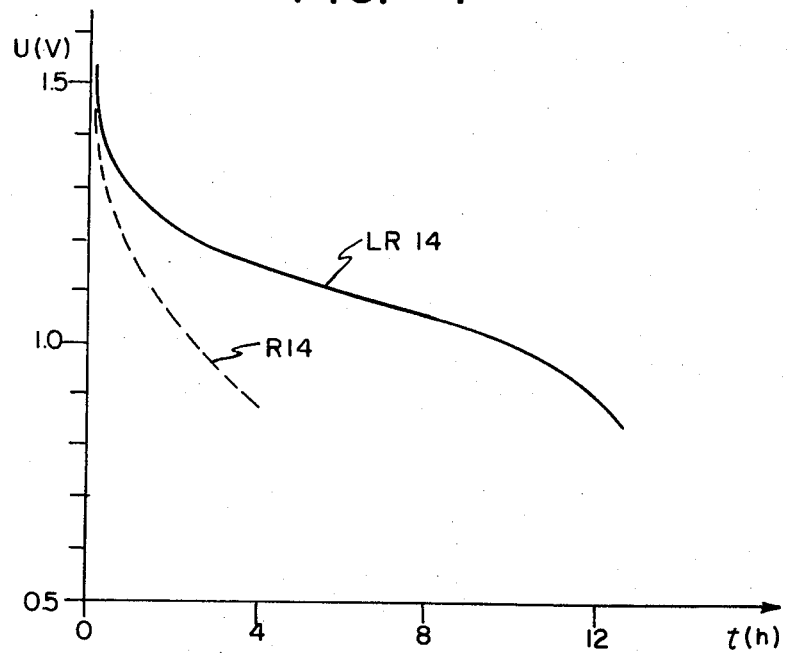
Figure 5:
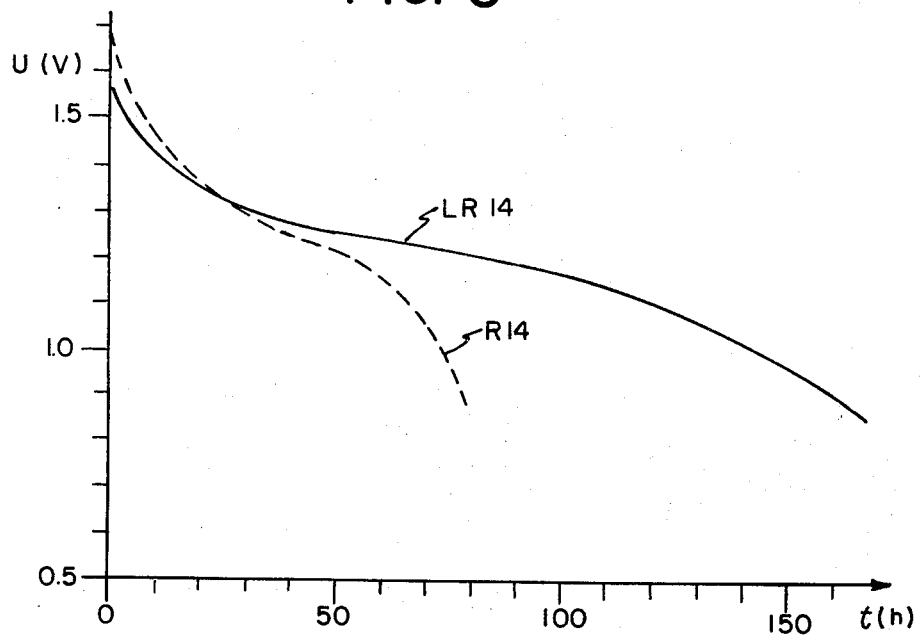

FIGS. 4 and 5 show discharge characteristics of two types of alkaline manganese-dioxide — zinc cells, namely LR 14 and R 14, at discharge or load resistances of 5 and 40 ohms, respectively, in both cases for 4 hours per day.

Figure 1:
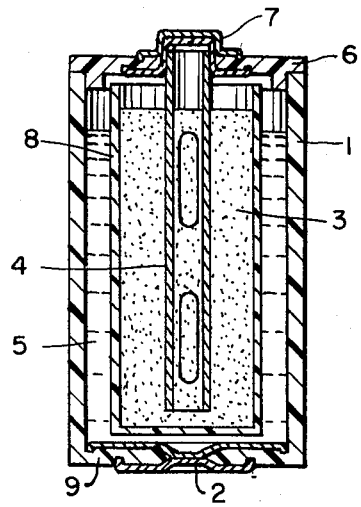

In the exemplary embodiment shown in FIG. 1, numeral 1 denotes a plastic cup or beaker, such as from polystyrene, having a metallic electrical contact 2 at its bottom, including in this example two metal plate members welded together in their central areas, as shown. The outer plate member is at least partly embedded in the plastic.

Within beaker 1 is centrally disposed a cylindrical cathode 3 which, as a matter of example, may consist of 60 percent by weight of electrolytic (alkaline) manganese dioxide or manganite, 10 percent graphite and 30 percent 9 N KOH saturated with zincate. Other compositions are of course possible within the framework of the present invention.

For a better adhesion of the cathode mass the electrode 3 includes a perforated metal tube or sleeve 4 which serves for conducting the current to an electrical contact 7 provided in a separate cap portion 6 of the beaker. Different forms of conductors will be mentioned somewhat later.

A pasty anode 5 is disposed in beaker 1, about cathode 3, and consists, for example, of 60 percent by weight of zinc powder, 9 N zincate-saturated potassium hydroxide and a suitable gelling medium. Electrodes 3, 5 have a separator 8 therebetween, as shown, which may consist of a cellophane or the like paper wound or wrapped about manganese-dioxide electrode 3.

In this embodiment, bottom 9 of beaker 1 is unitary therewith, but the earlier-mentioned cap portion 6 is separate and may be united with beaker 1 in a leakproof manner, such as by means of ultrasonic welding or the like. It can be seen that electrical contact with this cell embodiment is made at points 2 and 7, respectively, the former being in direct contact with anode 5 while the latter is electrically connected to cathode 3 by way of sleeve 4.

Figure 2:
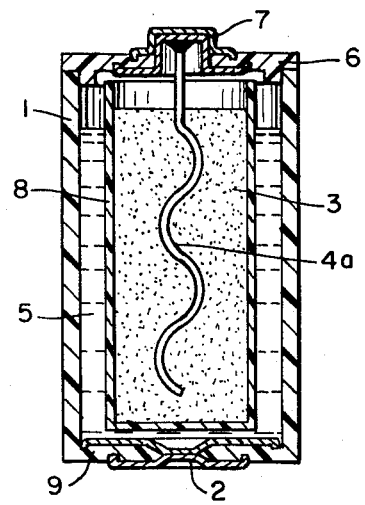
FIG. 2 is a similar view of a modified construction.

The modification shown in FIG. 2 is similar in most parts except that a spiral-shaped metal wire 4a is used as an electrical conductor between electrode 3 and contact 7. The wire is preferably embedded in or pressed into the electrode mass to provide both mechanical rigidity and good electrical contact.

Figure 3:
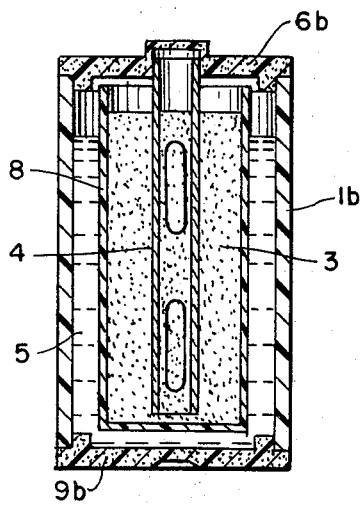
FIG. 3 is yet another preferred embodiment.

The third illustrated embodiment, FIG. 3, again shows the perforated sleeve 4 of FIG. 1 but a separate cap portion 6b and a similar separate bottom portion 9b, joining terminal portions of a sleeve-shaped beaker 1b, as illustrated. These portions 6b, 9b are made of an electrically conductive plastic, such as one having metal powder or graphite embedded therein or compounded thereto. The portions at the ends of the beaker are substantially plate-shaped, preferably with inner rims or noses, as illustrated, for a better joining to beaker 1b when welded or otherwise connected thereto. In this embodiment, no contact (such as 2, 7 shown earlier) is required because the top and bottom portions of the beaker themselves provide the electrical contact, cap portion 6b being mechanically joined to perforated sleeve 4.

It is possible to seal the inventive battery cell by an appropriate sealing compound applied in said beaker (not illustrated).

FIGS. 4 and 5 illustrate, as a matter of interest, the discharge characteristics of alakline primary battery cells according to the invention, namely those of type LR 14, as compared to conventional cells marked R 14. These designations conform to IEC Publication No. 86 and its supplement No. 861, dated 1962, which are internationally accepted designations.

The conventional Leclanche-type primary battery cell is R 14 which means, according to the IEC publication, that this is a cylindrical primary element or cell having about 49 millimeters height and about 24 mm diameter. The inventive primary cell, tested in comparison with the conventional type, is designated LR 14 in which "L" simply means that this is an alkaline primary cell of the manganese-dioxide — zinc type having, for example, potassium hydroxide as its electrolyte.

It can be seen from FIGS. 4 and 5 that under fully identical load conditions, namely when the cells were subjected to a discharge into a load of 5 ohms (FIG. 4) and of 40 ohms (FIG. 5) for 4 hours each day, the inventive cell LR 14 by far outperformed the Leclanche-type cell R 14.

At only 5 ohms load, the inventive cell dropped to about 1.0 U (V) only after 12 hours service while the same value was reached by the conventional type in less than 4 hours.

At the more conservative load of 40 ohms, the inventive cell lasted about 150 hours before reaching the U (V) value of 1.0 while the conventional type took a sudden dip at 80 hours already. This shows the superiority of the inventive construction, contributable to the novel construction and arrangement as described and claimed herein, rather than to the compositions of the electrodes or other non-mechanical parameters.

It should be understood, of course, that the foregoing disclosure relates only to preferred embodiments of the invention, and that it is intended to cover all changes and modifications of the examples described which do not constitute departures from the spirit and scope of the invention.

What we claim is:

1. An alkaline primary battery cell, comprising two electrodes, namely a cylindrical, alkaline manganese-dioxide cathode and a powdery zinc anode; a separator between said electrodes; with the improvement constituted by a non-metallic, plastic beaker for lodging said electrodes and said separator, said beaker constituting the only element to contain, protect and seal in said electrodes and said separator, with the omission of a cup, beaker, cylindrical can and the like element therefor; and at least one hermetically sealing electrical contact in a terminal portion of said beaker, in electrical contact with at least said cathode; wherein said beaker is in direct contact with said anode.

2. The cell as defined in claim 1, wherein said beaker is made of a plastic material permeable to hydrogen.

3. The cell as defined in claim 1, further comprising a sealing compound applied within said beaker.

4. The cell as defined in claim 1, further comprising a plastic cap portion connected to said beaker in a leak-proof manner.

5. The cell as defined in claim 1, wherein said at least one contact is molded into said terminal portion of the beaker.

6. The cell as defined in claim 1, wherein said beaker has a bottom portion made of an electrically conductive plastic material, said bottom portion being in electric contact with said anode.

7. The cell as defined in claim 1, further comprising a metallic conductor between said at least one contact and said cathode.

8. The cell as defined in claim 7, wherein said conductor is a wire embedded in said cathode.

9. The cell as defined in claim 7, wherein said conductor is a tubular member within said cathode.

10. The cell as defined in claim 9, wherein said tubular member is perforated.

* * * * *